United States Patent

[11] 3,607,536

[72] Inventor Robert Anthony Bragole
West Peabody, Mass.
[21] Appl. No. 774,204
[22] Filed Nov. 7, 1968
[45] Patented Sept. 21, 1971
[73] Assignee USM Corporation
Flemington, N.J.

[54] TREATMENT OF RESIN SURFACES TO IMPROVE ADHESIVE BONDING, ADHESIVE BONDING PROCESS AND RESIN BODIES WITH TREATED SURFACES
20 Claims, No Drawings

[52] U.S. Cl. .................................................. 156/272,
156/331, 117/93.31, 117/138.8 B, 117/138.8 E,
117/161 KP, 117/DIG. 7, 161/412, 204/159.19
[51] Int. Cl. ...................................................... B44d 1/50,
C08f 27/10
[50] Field of Search ............................................ 117/93.31,
161 KP, DIG. 7, 136.8 B, 138.8 E; 204/159.19,
159.11; 260/878, 858, 830, 77.5 AX, 77.5 CR;
156/331, 272, 306, 307, 308, 327; 161/412

[56] References Cited
UNITED STATES PATENTS

| | | | |
|---|---|---|---|
| 3,023,126 | 2/1962 | Underwood et al. | 117/161 KP |
| 3,179,547 | 4/1965 | Kigane et al. | 156/308 X |
| 3,240,649 | 3/1966 | Atwell | 156/308 X |
| 3,290,207 | 12/1966 | Magat et al. | 117/93.31 X |
| 3,449,294 | 6/1969 | Danhauser et al. | 117/161 KP |
| 3,505,105 | 4/1970 | Macfarlane et al. | 117/161 KP |

*Primary Examiner*—Alfred L. Leavitt
*Assistant Examiner*—J. H. Newsome
*Attorneys*—W. Bigelow Hall, Richard A. Wise and Benjamin C. Pollard

ABSTRACT: Surfaces of difficultly bondable resinous substrates, e.g. polyethylene, are treated to provide an organic isocyanate and a photosensitizer at the surface and thereafter subjected to ultraviolet radiation. The radiation causes an interaction between the isocyanate and the surface of the substrate to create a surface stratum for strong adhesive bonding.

3,607,536

TREATMENT OF RESIN SURFACES TO IMPROVE ADHESIVE BONDING, ADHESIVE BONDING PROCESS AND RESIN BODIES WITH TREATED SURFACES

FIELD OF THE INVENTION

This invention relates to adhesive processes and particularly processes including the treatment of low-energy polymeric resin bodies to enable strong bonding and to resin bodies so treated.

BACKGROUND OF THE INVENTION

Polyalkylene plastic materials, particularly polyethylene and polypropylene possess many desirable characteristics including inertness to most chemicals and solvents at ordinary temperatures, resistance to electricity, toughness and flexibility. By reason of these and other properties it has been desired to employ such materials in numerous relationships where the bonding of the material to itself or to other surfaces is required.

These materials present a waxy, sometimes paraffinlike surface character, i.e. have a low critical surface tension of wetting, which interferes with adhesion by the commonly employed adhesive or coating agents. Also it appears that many polyalkylene plastics have at their surfaces a weak boundary layer developed in the course of molding or other shaping. In many relationships, for example, in the use of flexible polyethylene sheet material or the lamination of polyethylene to flexible sheet materials, hot melt adhesives which operate to fuse and integrate with the polyethylene surface may be used to bond the surface. However, there are many relationships where because of the rigidity of the materials to be combined or because of special contours or other factors, such hot melt adhesive systems are not usable.

SUMMARY OF THE INVENTION

It is an object of the present invention to treat surfaces of these difficultly bondable resinous materials to enable them to be readily and strongly bonded by adhesives.

It is a further object to provide a simple practical process for adhering difficultly bondable resinous materials.

It is a still further object of the invention to provide an article having a main body portion composed of difficultly bondable polymer resin material and an adhesive bondable surface stratum integral with the main body of material.

To these ends and in accordance with a feature of the present invention an organic isocyanate and a photosensitizer are provided at the surface of a body of low surface tension of wetting polymer resin material and the surface is subjected to controlled ultraviolet radiation treatment to produce a chemical linkage between the resin material and the organic isocyanate to form a urethane stratum integral with the resin body and capable of being bonded by adhesives. Adhesive bonds to the surface are formed by use of adhesives known to be capable of bonding to polyurethane or rubber surfaces and assembling the adhesive-coated surface against the surface of a second body to form an adhesive joint.

PREFERRED EMBODIMENTS

The process of the present invention is concerned with making strong structural adhesive joints to low surface tension of wetting substrates, such as the polyolefins, e.g. polyethylene, as distinguished from mere surface treatments to render these materials printable. Strong joints are secured by the concurrent action of ultraviolet light radiation, a photosensitizer and an isocyanate which cooperate to produce on the treated surface of the polyolefin a cross-linked urethane stratum which is integral with the body of the resin. This treatment thus provides the known prerequisites for a strong structural adhesive joint, namely, the provision of a surface having a surface tension of wetting allowing it to be wet by adhesives and the creation of such a surface under conditions which avoid the weak boundary layers commonly created by oxidative treatments of the surface to render it more readily printable. It is emphasized that the treatment including the adhesive bonding to complete the structural joint relies primarily on reaction of the isocyanate only with reactive groups generated at the surface of the polyolefin to provide the cross-linked urethane stratum and not on bonding through establishment of surface-to-surface linking structure by reaction of isocyanate in an adhesive with active groups on the surface to be bonded and on the polyolefin surface.

Materials which are treated according to the process of the present invention are low surface tension of wetting substrates which because of this characteristic are difficult to wet and bond with adhesives. Materials considered as having low surface energy are those of which the critical surface tension of wetting is 35 dynes per centimeter or less as determined by contact angle measurements. (See page 20 of Contact Angle, Wettability and Adhesives, No.43 of the "Advances in Chemistry Series," published 1964 by the American Chemical Society.) Included in the category are polyethylene, polypropylene, copolymers of ethylene and propylene alone or with a very low percentage of a nonconjugated diene, e.g. the commercial terpolymer EPDM comprising about 64 percent ethylene, about 34 percent propylene and about 2 percent 1,4 hexadiene, and fluorine-containing polymers such as polyvinyl fluoride and polyvinylidene fluoride. Polymers for treatment by the present process must have at least some hydrogen on a carbon chain in a repeating unit in the polymer chain.

The first step in the process is the application to the surface of the material to be bonded of a deposit of an organic isocyanate and a photosensitizer. Useful isocyanate compounds may have an -NCO functionality of one or more than one. Among isocyanates which have been used are triphenylmethane triisocyanate, polyarylene polyisocyanate (-NCO functionality of 2.8), tolylene diisocyanate, methylene bis 4 phenyl isocyanate and phenyl isocyanate. Other compounds having at least one active —NCO group, such as those from reaction of compounds having an active hydrogen, e.g. an alcohol, glycol or amine with an isocyanate, maybe used. These materials may be applied in organic solvent solution. No special conditions of temperature or time are necessary for the contact and it has been found that the desired results are obtained by merely spreading a solution over the surface to be ultraviolet radiated and wiping off the excess, the whole treatment being carried out at room temperature. Any convenient solvent may be used for the isocyanate. In general it is preferred to use volatile solvents which evaporate rapidly. Useful solvents include methylene chloride, methyl ethyl ketone, and tetrahydrofurane; but other solvents may be used which do not interfere with the activity of the isocyanate. Solutions containing as little as 0.25 percent by weight of the isocyanate may be used, but it is preferred to use concentrations of from about 1 percent to about 10 percent. Greater percentages of isocyanate are not necessary, and aside from the unnecessary cost may be less effective than the lower percentages.

The —NCO groups of the applied compound will not react per se with the untreated surfaces of such materials as polyethylene and there is provided at the surface to be bonded at least a minor amount of a photosensitizer effective under the action of ultraviolet radiation to generate groups chemically binding the surface with the applied isocyante-containing compound. Such ultraviolet radiation sensitizers may be halogenated hydrocarbons such as methylene chloride, trichloroethylene, and chloroform, ketone materials such as benzophenone, acetonphenone, benzoin, 2-acetonaphtohone or other known photosensitizers such as acenaphthene and fluorine. In general, these materials are excited by ultraviolet radiation and, in excited state, interact with the resin substrate to initiate reactions producing groups which will react with isocyanates. sensitizers in which carbon atoms are linked to other atoms by multiple bonds as in benzophenone and trichloroethylene are believed to be engrafted into the molecular chain of the resin substrate and may themselves provide groups which will react with isocyanate. As little as 2 percent by weight of photosensitizer in an applied solution may be effective; but higher percentages may be used without adverse results.

Many of these photosensitizers such as methylene chloride and trichloroethylene are liquid solvents for the organic isocyanates and it has been found convenient to apply the isocyanate as a solution in the photosensitizer. However, the isocyanate and photosensitizer may be applied separately or may be applied jointly, for example, in solution in a common solvent.

It has also been found practical to include the isocyanate and photosensitizer in an adhesive or coating or to mix photosensitizer with an adhesive or coating material which is or includes a compound, e.g. a polyurethane, having active isocyanate. This is of particular value where at least one of the surfaces to be joined is transparent to ultraviolet radiation; since the composition including adhesive or coating with isocyanate and photosensitizer may be applied to one or both surfaces, the surfaces maybe assembled and the assembly subjected to ultraviolet radiation.

When the organic isocyanate and the photosensitizer have been supplied to the surface of the material to be bonded, the surface is exposed to ultraviolet radiation. The ultraviolet radiation bombards the surface of the plastic and the photosensitizer with photons which excite the molecules to cause chemical and electronic charges. It has been found ultraviolet radiation at a wavelength of from 2,000 to 3,500 A. for as little as 300 watt seconds per square foot and preferably from about 350 to about 7,000 watt seconds per square foot generates groups which react with the isocyanate to form a strong urethane surface stratum. This stratum is integral with the body of material to be bonded and is easily wet and strongly adhered by adhesives effective to bond polyurethanes or rubbers.

Among adhesives and coating compositions which have been found useful are linear polyether glycol urethanes, linear polyester glycol urethanes, adhesives based on natural rubber and synthetic rubbers such as neoprene and butadiene acrylonitrile copolymer rubber particularly such adhesives containing heat-advancing phenolic resins and magnesium reacted heat-advancing alkyl constituted phenolic resins, curing-type epoxy resins and resinous polyesters. Polyesters for use as such or for combination with isocyanates to form urethanes may be made of condensation and polymerization of at least one dibasic organic acid with at least one glycol. Suitable dibasic acids include aromatic dibasic acids such as terephthalic acid, isophthalic acid, phenyl indane dicarboxylic acid, hexahydrophthalic acid anhydride and others, and aliphatic dibasic acids such as azelaic acid, suberic acid, sebacic acid and others. Useful glycols include 1,4 butane diol, 1,6 hexane diol, ethylene glycol and so on. The polyesters may be made by condensation of one or more than one dibasic acid and one or more than one glycol. Polyesters may also be made from polymerization of lactones such as E caprolactone.

Where the surfaces of the resin substrate to be bonded has been treated with isocyanate and photosensitizer and then exposed to ultraviolet radiation, the adhesive may be applied to the surface in any convenient manner. That is, it may be applied as solution, as a preformed film of adhesive, as powdered adhesive or in molten form. Where the adhesive mixture includes the photosensitizer and either free isocyanate or an adhesive component providing —NCO groups, it appears important that the adhesive be applied in liquid form to secure intimate contact of the photosensitizer and isocyanate with the surface of the substrate.

After application of the adhesives and after ultraviolet radiation, if that is to be done before assembly, the substrate and the surface which is to be bonded to it are assembled with the adhesive between them. The adhesive may be activated by solvent or heat before assembly or may be activated by heat after assembly.

The following examples are given to aid in understanding the invention. It is to be understood that the invention is not restricted to the particular materials or treatment conditions given in the Examples.

EXAMPLE I

A series of strips of low density polyethylene one-inch wide and 0.060 inches in thickness were dipped in a 1 percent solution of polyarylene polyisocyanate having an —NCO equivalent of 2.8 (PAPI) in trichloroethylene and were subjected to radiation by disposing surfaces of the strip at a distance of 3 inches from a 1,500 watt ultraviolet lamp (major wavelength 2,537A) for time periods calculated to give the dosage listed in Table I. After radiation, the treated surfaces were given an adhesive coating of a 25 percent solids solution in methylene chloride of a copolyester obtained by condensation of 27 parts by weight of terephthalic acid, 6.6 parts by weight of hexahydrophthalic anhydride and 17.65 parts by weight of sebacic acid with 15.7 parts by weight of cyclohexane dimethanol and 26.1 parts by weight of 1,4 butane diol, the copolyester having a melting point of 120° to 130° C. The adhesive coating was allowed to dry for about an hour at room temperature. Thereafter, the adhesive coatings were heated to 135° to 140° F. for about 30 seconds and pairs of strips were assembled in a lap joint to give 1-square-inch bonded area and subjected to a 240 lbs. per square inch pressure for 10 seconds. The joined strips were then mounted in the jaws of a tester which were separated at a rate of 2 inches per minute to determine the shear strength of the bonds.

TABLE I

| Irradiation | Shear Strength of Bond | Failure |
| --- | --- | --- |
| None—control | 16.0 | Interfacial |
| 858 watt-sec./sq. ft. | 62.0 | Severe stretching of plastic without any opening of the joint |
| 2,574 watt-sec./sq. ft. | 78.0 | Severe stretching of plastic without any opening of the joint |

In the table under "Failure" the term "Interfacial" means that the failure was a separation of the adhesive from the polyethylene at the interface. This is an indication that the adhesive failed to establish adequate wetting and strong adhesive engagement with the polyethylene.

As shown in the table, the radiation produced a four-fold or better increase in the strength of the bond and in fact the failure was only the failure of the material itself.

EXAMPLE II

A series of bonds was prepared and tested as in Example I but using a 1 percent solution of liquid methylene bis (4 phenyl isocyanate) in trichloroethylene as the liquid into which the strips of polyethylene were dipped before radiation.

Table II

| Irradiation | Shear Strength of Bond | Failure |
| --- | --- | --- |
| None—Control | | Interfacial |
| 858 watt-sec./sq. ft. | 73.0 | Severe stretching of plastic without any opening of the joint |
| 2,574 watt-sec./sq. ft. | 80.5 | Severe stretching of plastic without any opening of the joint |

As shown in the table, the effect of radiation was essentially the same as in Example I.

EXAMPLE III

A series of bonds was prepared and tested as in Example I but using a 1 percent solution of phenyl isocyanate in trichloroethylene as the liquid into which the strips of polyethylene were dipped before radiation.

TABLE III

| Irradiation | Shear Strength of Bond (psi) | Failure |
|---|---|---|
| None—control | 12.0 | Interfacial |
| 858 watt-sec./sq. watt-sec./sq. | 75.0 | Severe stretching of plastic without any opening of the joint |
| 2574 watt-sec./sq. ft. | 78.0 | Severe stretching of plastic without any opening of the joint |

As shown in the table, the effect of radiation was essentially the same as in Example I.

Example IV

Strips of high density polyethylene 1 inch wide and 0.060 inch in thickness were dipped in a 1 percent solution of polyarylene polyisocyanate in trichloroethylene, irradiated, cemented, dried and bonded together as in Example I.

The results of testing the bonds are reported in the following table.

TABLE IV

| Irradiation | Shear Strength of bond (p.s.i.) | Failure |
|---|---|---|
| None—control | 61.0 | Interfacial |
| 858 watt-sec/sq. ft. | 188.0 | Stock failure-without an opening of the joint |
| 2,574 watt-sec./sq. ft. | 195.0 | Stock failure—without an opening of the joint |

As in the preceding examples, a several-fold increase in strength of the bond is obtained by radiation.

EXAMPLE V

Strips of high density polyethylene 1 inch wide and 0.060 inch in thickness were dipped in a series of solutions of polyarylene polyisocyanate, i.e. PAPI in different liquids prior to radiation and then irradiated, cemented and tested as in Example I. The results are listed in the following table.

TABLE V

| Dipping medium | Irradiation, watt-sec./sq. ft. | Shear strength of bond (p.s.i.) | Failure |
|---|---|---|---|
| 1% PAPI in methylethyl ketone. | 858 | 120.0 | Interfacial. |
| 1% PAPI in trichloroethylene. | 858 | 188.0 | Stock failure—without any opening of joint. |
| 1% PAPI/5% benzophenone/methylethyl ketone. | 858 | 180.0 | Do. |
| 1% PAPI in trichlorethylele. | 2,574 | 195.0 | Do. |
| 1% PAPI/5% benzophenone/methylethyl ketone. | 2,574 | 193.0 | Do. |

It can be seen that a markedly superior bond is obtained where trichloroethylene or benzophenone was present in the dipping solution over the type of bond obtained where these materials were not present. This illustrates the importance of the presence of photosensitizer at the time of radiation.

EXAMPLE VI

The procedure of Example I was repeated using strips of polypropylene 1 inch wide by 0.060 inch thickness and using various concentrations of polyarylene polyisocyanate i.e., PAPI, in trichloroethylene as the dipping media and using radiation treatments as listed in the following table.

TABLE VI

| Dipping Medium | Irradiation | Shear Strength of Bond (p.s.i.) | Failure |
|---|---|---|---|
| 1% PAPI | None-control | 80.0 | Interfacial |
| 1% PAPI | 858 watt-sec. sq. ft. | 246.5 | Plastic broke without any opening of the joint Sensitizers in |
| 1% PAPI | 2,574 watt-sec. sq. ft. | 258.0 | Plastic broke without any opening of the joint |
| 5% PAPI | None-control | 76.0 | Interfacial |
| 5% PAPI | 858 watt-sec. sq. ft. | 244.0 | Plastic broke without any opening of the joint |
| 5% PAPI | 2,574 watt-sec. sq. ft. | 254.0 | Plastic broke without any opening of the joint |
| 20% PAPI | None-control | 41.5 | Interfacial |
| 20% PAPI | 858 watt-sec. sq. ft. | 153.5 | Interfacial/cohesive |
| 20% PAPI | 2,574 watt-sec. sq. ft. | 256.0 | Plastic broke without any opening of joint |

It can be seen that the bond obtained where the dipped polypropylene was subjected to radiation is several times the strength of the bond obtained where the material was not radiated. The results also show that where a very high concentration of the isocyanate was present, the bond was not as good as where a smaller quantity of the isocyanate was present. This suggests that the presence of excess uncombined polyisocyanate at the surface weakened and ultimate bond, perhaps by a plasticizing effect on the materials at the interface.

EXAMPLE VII

Strips of polypropylene film 1 inch wide by 0.001 inch in thickness were dipped in a 1 percent solution of polyarylene polyisocyanate in trichloroethylene, subjected to the radiation treatment listed in the following table and coasted with a 25 percent solid solution in methylene chloride of the copolyester noted in Example I. After application of the adhesive coating the coating was dried for 60 seconds and coated surfaces were then pressed together. Thereafter, the strips were separated in a peel pull adhesive tester using a jaw separation of 2 inches per minute. The results are listed in the table below.

TABLE VII

| Irradiation | Bond Strength (lb./in.) | Failure |
|---|---|---|
| None–Control | 1.0 | Interfacial |
| 400 watt-sec./sq. ft. | 6.0 | Stock failure |

It will be observed that the radiation increased the strength of the peel bond several times and that in fact the value of the bond strength was limited by the strength of the film.

EXAMPLE VIII

Strips of ethylene propylene diene terpolymer (EPDM) 1 inch by 0.090 inch in thickness were dipped in the solutions listed in the following table and subjected to the irradiation treatment also shown in the table. The irradiated strips were coated with a 25 percent solids solution in methylene chloride of the copolyester noted in Example I, dried for over one hour at room temperature, activated at 135° to 140° F. for 30 seconds and then pressed together with a pressure of 200 lbs. per square inch for 10 seconds. The bonded strips were inserted in the jaws of a peel pull tester and subjected to a peel test with a 12 inches per minute rate of separation of the jaws. The results are listed in the following table.

TABLE VIII

| Dipping medium | Irradiation, watt-sec./sq. ft. | Bond strength (lbs./in.) | Failure |
| --- | --- | --- | --- |
| None | (¹) | 2.7 | Interfacial. |
| 1% triphenylmethane triisocyanate in methylene chloride. | 858 | 19.5 | Stock failure. |
| 1% methylene bis (4 phenylisocyanate) in trichloroethylene. | 858 | 20.5 | Do. |
| 1% PAPI in trichloroethylene. | 858 | 23.5 | Do. |
| 5% triphenylmethane triisocyanate in methylene chloride. | 858 | 20.5 | Do. |
| 5% liquid methylene bis(4 phenylisocyanate) in trichloroethylene. | 858 | 23.5 | Do. |
| 5% PAPI in trichloroethylene. | 858 | 22.5 | Do. |

¹ None-control.

As in the previous examples the radiation of the isocyanate and photosensitizer treated surfaces of the materials were many times grater than the strength of bond without the radiation.

EXAMPLE IX 1 inch wide strips were cut from ethylene propylene diene terpolymer (EPDM) coated polyester fiber (Dacron) fabric and these strips were given the dipping and irradiating treatments listed in the following table. The strips were given a coating of an adhesive solution comprises of a 25 percent solids solution of the copolyester described in Example I and containing 4 percent by weight of polyarylene polyisocyanate, assembled, pressed together and tested as in Example VIII.

TABLE IX

| Dipping medium | Irradiation, watt-sec. sq. ft. | Bond strength (lbs./in.) | Failure |
| --- | --- | --- | --- |
| None | (¹) | 2.0 | Interfacial. |
| 1% PAPI in trichloroethylene. | 858 | 7.0 | Slight delamination. |
| 5% PAPI in trichloroethylene. | 858 | 10.0 | Delamination. |
| 5% PAPI in trichloroethylene. | 350 | 9.0 | Slight delamination. |

¹ None-control.

As shown in the table, the radiation treatment produced a several fold increase in bond strength.

EXAMPLE X

A 50 percent solids coating solution was made up comprising 100 parts by weight of a linear glycol adipate, a polyester having a hydroxyl number of 50 to 55, 90 parts by weight of finely divided mineral filler, 39 parts by weight of a plasticizer 21 parts by weight of black pigment, 65 parts by weight of a phenol-blocked isocyanate (Mondur S) and 3.3 parts by weight of a tin catalyst. The solvent mixture for the coating solution comprised by volume 40 percent of methylene chloride, 40 percent of methyl ethyl ketone and 20 percent toluene. This coating solution is referred to in the following table as "Coating A." A second coating solution referred to in the table as "Coating B" was prepared by mixing 32 parts by weight of "Coating A" with one part by weight of a 70 percent by weight solution of polyarylene polyisocyanate in methyl ethyl ketone.

TABLE X

| Coating | Irradiation | Post Cure at 150°C. (min.) | Result |
| --- | --- | --- | --- |
| Coating A | None | 25 | Poor |
| Coating B | None | 25 | Poor |
| Coating A | None | 30 | Poor |
| Coating B | None | 30 | Poor |
| Coating A | 858 watt-sec./sq. ft. | 24 | Good |
| Coating B | 858 watt-sec./sq. ft. | 24 | Poor |
| Coating A | 858 watt-sec./sq. ft. | 26 | Good |
| Coating B | 858 watt-sec./sq. ft. | 26 | Poor |
| Coating A | 858 watt-sec./sq. ft. | 27 | Good |
| Coating B | 858 watt-sec./sq. ft. | 27 | Poor |
| Coating A | 858 watt-sec./sq. ft. | 28 | Good |
| Coating B | 858 watt-sec./sq. ft. | 28 | Poor |
| Coating A | 858 watt-sec./sq. ft. | 29 | Good |
| Coating B | 858 watt-sec./sq. ft. | 29 | Poor |
| Coating A | 858 watt-sec./sq. ft. | 30 | Good |
| Coating B | 858 watt-sec./sq. ft. | 30 | Poor |

In the work reported in the table, coatings were applied to the strips of the terpolymer, allowed to dry 1 minute prior to the irradiation treatment and immediately after irradiation were subjected to a post-curing involving heating to 150° C. for the times listed in the table.

In the results listed in the table, a poor result was one in which the coating could be peeled easily and interfacially from the terpolymer base whereas a good result was one on which the coating could not be separated from the terpolymer substrate at all or only incompletely and with difficulty.

Although the coating solution "A" included blocked isocyanate which was activated in the course of the post-curing coating "A" did not have free —NCO available at the time of irradiation. It will be observed that the results where free isocyanate is present at the time of radiation are consistently good while the results where the free isocyanate is not present during radiation are consistently poor.

EXAMPLE XI

Strips of vinyl fluoride polymer (Tedlar) 1 inch wide by 0.001 inch in thickness were coated with a 25 percent solids solution in methylene chloride of the copolyester noted in Example I to which in certain instances as noted in the table photosensitizer and/or polyarylene polyisocyanate and/or dibutyl tin dilaurate catalyst had been added. After application of the adhesive coatings, the coatings were dried for 60 seconds and coated surfaces were then pressed together. Thereafter the assemblies were subjected to ultraviolet radiation to the extents noted in the table. The resulting laminates were subjected to testing in a peel pull adhesive tester using a jaw separation of 2 inches per minute. The results are listed in the table.

TABLE XI

| Additive to cement | Post irradiation of laminate (sec.), watt-sec./sq. ft. | Time delay ¹ | Bond strength (lb./in.) | Failure |
| --- | --- | --- | --- | --- |
| None | (²) | ------- | 0.5-1.0 | Interfacial. |
| Do | 686 | 5 | 1.0 | Do. |
| 5% benzophenone | 686 | 5 | 2.5 | Cohesive. |
| 5% benzophenone, 1% PAPI. | (²) | 5 | 1.5 | Interfacial. |
| Do | 686 | 5 | 3.0 | Cohesive. |
| 5% benzophenone, 1% PAPI, 0.1% catalyst. | 686 | 5 | 1.0 | Interfacial. |

¹ Before irradiation of laminate (hours).
² None-control.

The results shown that a substantial improvement in bond strength was obtained by radiating the laminate-containing photosensitizer and isocyanate in addition to the copolyester resin.

It is noted that where the catalyst was present, the bond was less than where the catalyst was not present. This s due to the interaction of the isocyanate with hydroxyl groups in the polyester before irradiation so that free —NCO was not available for surface reaction during irradiation. In fact, gelation of the cement will occur in less than 5-hour delay used before radiation.

EXAMPLE XII

Polyethylene heel-rise elements were dipped in solutions of polyarylene polyisocyanate in trichloroethylene for the periods noted in the table and thereafter subjected to ultraviolet radiation as noted in the table.

Surfaces of rubber heels to be joined to the polyethylene heel-rise elements were subjected to roughing.

Each of the surfaces to be bonded was coated with a 25 percent solids solution in methylene chloride of the copolyester noted in Example I, dried for 1 hour at room temperature, activated at a temperature of about 140° F. for 30 seconds and then assembled with the coated surface of the polyethylene heel-rise element against the coated surface of the heel and subjected to a 225 lbs. per square inch pressure for 10 seconds. On colling, the assemblies were pulled apart and the results noted in the table.

TABLE XII

| Exp. 0 | Surface Preparation of Rubber Heels | Result |
|---|---|---|
| 1 | (a) 1% PAPI, trichloroethylene dip for 3 min. (b) No irradiation | Interfacial from polyethylene |
| 2 | Same as (1) except irradiated for 858 watt-sec./sq. ft. | Cohesive |
| 3 | Same as (1) except quick dip in 1% PAPI/trichloroethylene | Interfacial from polyethylene |
| 4 | Same as (3) except irradiated for 858 watt-sec./sq. ft. | Heel stock failure |
| 5 | Same as (3) except medium is 20% PAPI trichloroethylene | Interfacial from polyethylene |
| 6 | Same as (5) except irradiated for 858 watt-sec./sq. ft. | Interfacial from polyethylene |

The results in the table show that excellent bonds were obtained where the polyethylene surface which had been treated with the solution of polyarylene polyisocyanate in trichloroethylene was subjected to ultraviolet radiation whether the period during which the polyethylene was held in the solution was for as long as 3 minutes or for a quick dip. As in the preceding example, poorer results were obtained where high concentrations of the polyarylene polyisocyanate were present in solution which demonstrated that excessive isocyanate at the interface is undesirable since it apparently acts as plasticizer and prevents good wetting by the adhesive.

EXAMPLE XIII

Strips of high density polyethylene film 1 inch wide by 0.06 inch in thickness were dipped in a 1 percent solution of phenyl isocyanate in trichloroethylene or in a 1 percent solution of liquid methylene bis (4 phenyl isocyanate) in trichloroethylene and subjected to radiation for the periods shown in the table. The radiated surfaces were coated with a two-part epoxy adhesive prepared by mixing equal parts by volume of a liquid polyamide having an amine value of 290 to 320 (measured as mg. KOH per gram) and a liquid diglycidyl ether having an epoxy assay of 185 to 200 grams of resin per gram mol. of epoxide. The coated surfaces were assembled and cured for 24 hours at room temperature.

The joined strips were then mounted in the jaws of a tester which were separated at a rate of 2 inches per minute to determine the shear strength of the bonds. As shown in the table, the radiation showed a several fold increase in the strength of the bond and in most instances failure of the bond of strips which has been radiated was due to failure of the material itself.

TABLE XIII

| Dipping medium | Irradiation, watt-sec./sq. ft. | Shear strength of bond (p.s.i.) | Failure |
|---|---|---|---|
| 1% phenyl isocyanate in trichloroethylene. | None | 40.0 | Interfacial. |
| Do | 858 | 254.0 | Stock failure. |
| Do | 2,574 | 254.0 | Do. |
| 1% liquid methylene bis (4 phenyl isocyanate) in trichloroethylene. | None | 33.0 | Interfacial. |
| Do | 858 | 134.0 | Cohesive. |
| Do | 2,574 | 254.0 | Stock failure. | having thus described my invention what I claim as new and desire to secure by Letters Patent of the United States is:

1. The process for treating a body of a polymer resin having at least some hydrogen on a carbon chain in a repeating unit in the polymer chain to provide a surface stratum adapted for bonding by adhesives, said process comprising supplying a photosensitizer and an organic isocyanate at the surface of said body to be bonded and thereafter while said isocyanate is on said surface radiating said surface with ultraviolet rays to form a urethane stratum at said surface integral with the polymer resin of said body.

2. The process as defined in claim 1 in which said radiation provides at least about 300 watt seconds per square foot of said surface at a wavelength of from 2,000 to 3,500 A.

3. The process as defined in claim 2 in which said organic isocyanate and said photosensitizer are applied to said surface in a common solution.

4. The process as defined in claim 3 where said solution contains at least about 2 percent of photosensitizer and at least about 0.25 percent or organic isocyanate.

5. The process as defined in claim 3 in which said organic isocyanate is present in amounts of from about 1 percent to about 10 percent by weight based on the weight of the solution and in which the solvent is volatile liquid photosensitizer.

6. The process as defined in claim 3 in which said solution also contains an adhesive.

7. The process as defined in claim 4 in which said solution contains at least about 2 percent by weight of photosensitizer, from about 1 to about 10 percent by weight of an organic isocyanate and contains a resinous adhesive.

8. The process as defined in claim 8 in which said adhesive is selected from the group consisting of polyether glycol urethanes, polyester glycol urethanes, resinous polyepoxides, resinous polyesters from condensation and polymerization of at least one dibasic organic acid an at least one glycol and resinous polyesters from polymerization of lactones.

9. The process for bonding a body of a polymer resin having at least some hydrogen on a carbon chain in a repeating unit in the polymer chain to another surface comprising the steps of supplying a photosensitizer and a organic isocyanate at the surface to be bonded of said body, thereafter while sad isocyanate is on said surface radiating said surface with ultraviolet to for a urethane stratum at said surface integral with the polymer resin of said body, assembling said body with said surface against the surface of a second body with adhesive at the joint between said surfaces and hardening the adhesive to bond said bodies firmly together.

10. The process as defined in claim 9 in which said organic isocyanate and said photosensitizer are supplied to the surface of said body of polymer resin in a common solution and in which said radiation provides at least about 300 watt seconds per square foot at a wavelength of from 2,000 to 3,500 A.

11. The process as defined in claim 10 in which said solution contains at least about 2 percent by weight of photosensitizer and at least about 0.25 percent by weight of organic isocyanate based on the weight of said solution.

12. The process as defined in claim 10 in which said adhesive is applied to said surface after the ultraviolet radiation.

13. The process as defined in claim 11 in which said adhesive is applied after ultraviolet radiation.

14. The process as defined in claim 12 in which said adhesive is selected from the group consisting of polyether glycol urethanes, polyester glycol urethanes, resinous polyepoxides, resinous polyesters from condensation and polymerization of at least one dibasic organic acid and at least one glycol and resinous polyesters from polymerization of lactones.

15. The process as defined in claim 10 in which said solution contains resinous adhesive.

16. The process as defined in claim 11 in which said solution contains a resinous adhesive.

17. The process as defined in claim 14 in which said adhesive is selected from the group consisting of polyether glycol urethanes, polyester glycol urethanes, resinous polyepoxides, resinous polyesters from condensation and polymerization of at least one dibasic organic acid and at least one glycol and resinous polyesters from polymerization of lactones.

18. A body of polymer resin having at least some hydrogen on a carbon chain in a repeating unit in the polymer chain and a urethane stratum at a surface of said body to be bonded, said stratum being integral with the polymer resin of said body.

19. A body of polymer resin as defined in claim 18 having a layer of adhesive in wetting adhesive engagement with said urethane stratum.

20. a body of polymer resin as defined in claim 19 in which said adhesive is selected from the group consisting of polyether glycol urethanes, polyester glycol urethanes, resinous polyepoxides, resinous polyesters from condensation and polymerization of at least one dibasic organic acid and at least one glycol and resinous polyesters from polymerization of lactones.